July 24, 1928.

A. FRANCO

ARTICULATED COUPLING FOR RIGID FRAME UNITS

Filed Feb. 11, 1925  4 Sheets-Sheet 1

Inventor
Attilio Franco
by Steward & McKay
his attorneys

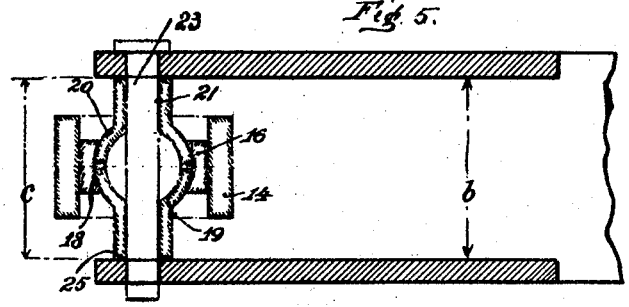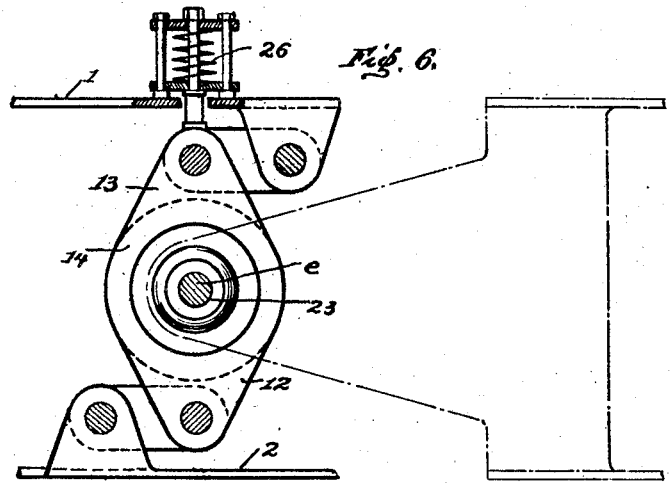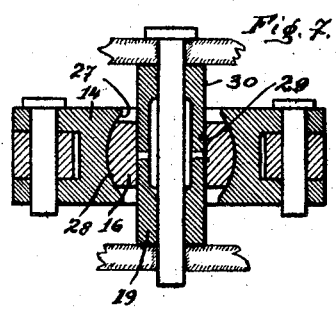

July 24, 1928.  1,678,428
A. FRANCO
ARTICULATED COUPLING FOR RIGID FRAME UNITS
Filed Feb. 11, 1925  4 Sheets-Sheet 3
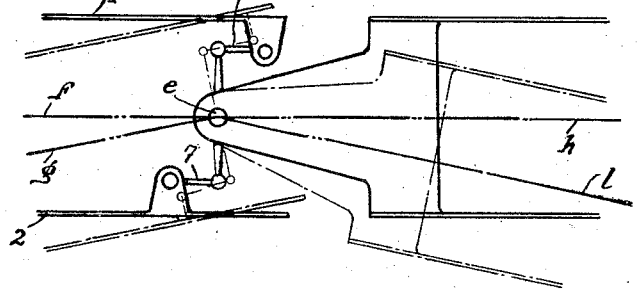
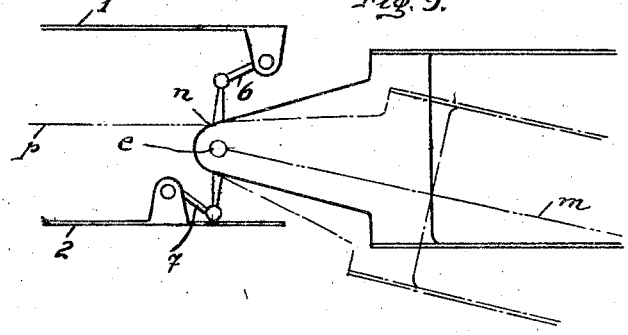
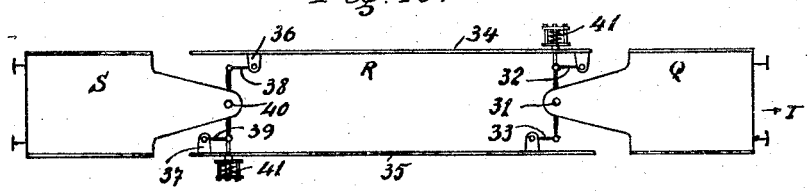
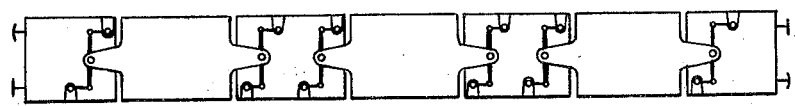

July 24, 1928. 1,678,428
A. FRANCO
ARTICULATED COUPLING FOR RIGID FRAME UNITS
Filed Feb. 11, 1925 4 Sheets-Sheet 4

Inventor
Attilio Franco
by Steward & McKay
his attorneys

Patented July 24, 1928.

1,678,428

UNITED STATES PATENT OFFICE.

ATTILIO FRANCO, OF MILAN, ITALY.

ARTICULATED COUPLING FOR RIGID-FRAME UNITS.

Application filed February 11, 1925, Serial No. 8,589, and in Italy February 11, 1924.

The present invention has for its subject matter a novel articulated coupling for rigid frame units.

The accompanying drawing illustrates by way of example only one of the various designs by which the invention can be carried into practice.

Fig. 5 is a vertical section through the end of the rigid frame shown in Fig. 2 and connected to the articulation system shown in Figures 1 and 3.

Fig. 6 is a plan view showing the articulated coupling fitted with a double effect return spring.

Fig. 7 is a vertical section showing a modified form of the articulation proper.

Figures 8 and 9 illustrate the working of the coupling.

Fig. 10 schematically shows the application of two articulated couplings according to the invention to the connection of three rigid frame vehicles.

Figure 11:
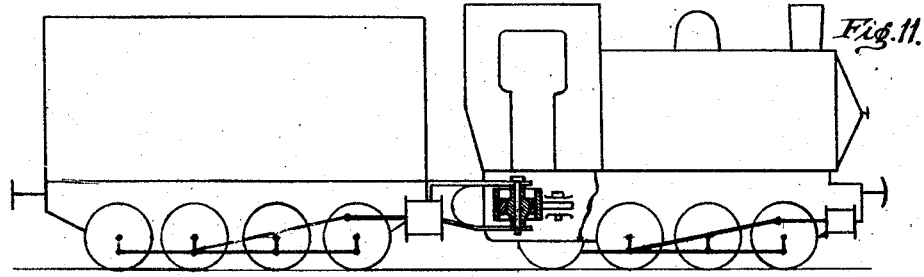
Figure 12:
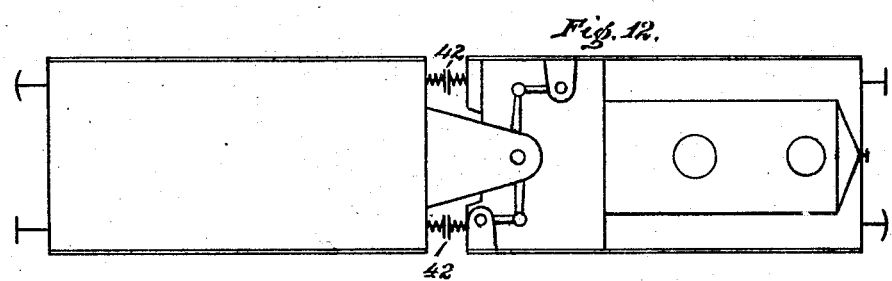

Figures 11 and 12 are an elevation and plan, respectively showing the application of the novel coupling to the connection of two units each of which is fitted with driving wheels.

Figure 13:
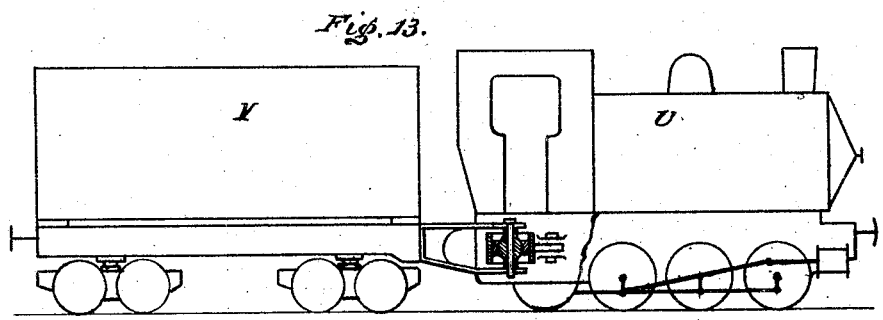
Figure 14:
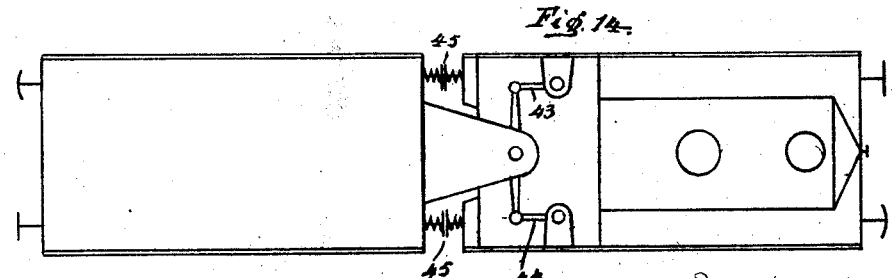

Figures 13 and 14 show an application, in elevation and plan respectively, to the connection of a tractive with a trailing vehicle.

Fig. 15 shows a method of connecting several vehicles with one another.

Figure 1:
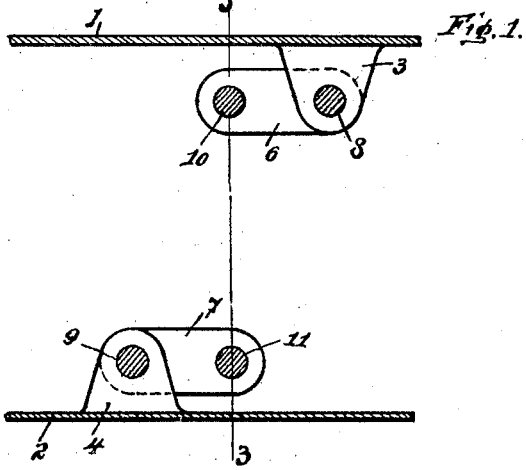
Fig. 1 is a plan view showing by way of example a pair of links pivotally connected to the sides of a frame.
Figure 2:
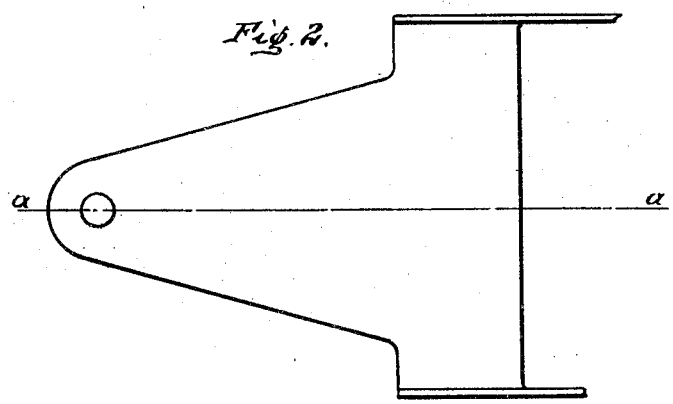
Fig. 2 is a plan view showing the end of a rigid frame to be pivotally connected to the system shown in Fig. 1.

With reference to Fig. 1, 1 and 2 are two longitudinal beams connected to one another in any convenient manner so as to form a rigid frame.

To the longitudinal beam 1 a lug 3, and to the longitudinal beam 2 a lug 4 is secured.

Figure 4:
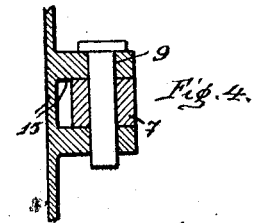
Fig. 4 shows a detail of the lug and link connection between the members 7 and 9 of Fig. 1.

To each lug 3 and 4 (which, as shown in Fig. 4, may have the form of a fork 5) is pivotally attached one end of a link 6 or 7 respectively by means of a cylindrical pin 8 and 9 respectively.

Figure 3:
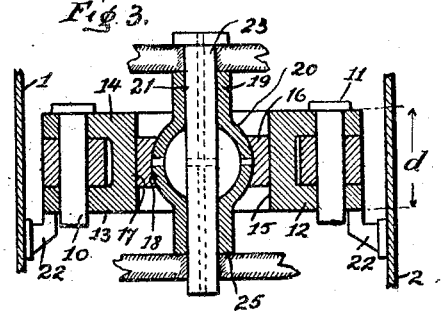
Fig. 3 is a vertical section through the articulation system shown in Fig. 1, the section being taken on the line 3—3 in said Fig. 1.

As may be seen from Fig. 3, the opposite end of the links 6 or 7 is pivotally attached by means of a cylindrical pin 10 and 11 respectively to the forked lug 12 and 13 respectively of the plate 14. The internal surface 15 of this plate has straight vertical generating lines and is cylindrical.

Against the said surface 15 is slidably arranged the bearing 16, made in two or more pieces, the external surface 17 of which is cylindrical to suit the cylindrical surface 15 of the plate 14 while its internal surface 18 is spherical.

In contact with spherical surface 18 is the center bushing 19, the outer surface of which is spherical in the portion which slides in the bearing 16.

The center bushing 19 extends above and below the plate 14 and is hollow inside, as may be seen from Fig. 3, its ends having straight vertical generating lines forming a cylindrical surface as shown at 21.

The plate 14 may be supported by the links 6 and 7, or these two links may be relieved from the plate weight in the manner shown in Fig. 3, in which the plate weight is taken on brackets 22, of any convenient form, secured to the longitudinal beams 1 and 2.

Figures 2 and 5 represent in horizontal projection, and in vertical section through $a$—$a$ respectively a rigid frame adapted to engage the members 14, 16 and 19.

The connection between the two rigid frames is effected by inserting the spindle 23 into the bore of the center bushing 19. As shown in Fig. 5, the bottom face 25 of the bushing 19 rests on the rigid frame, thus supporting both the bushing 19 and the bearing 16.

The frame height —$b$— in Fig. 5 is equal to the height —$c$— of the center bushing 19, and the height —$c$— in its turn exceeds the height —$d$— of the plate 14 by an amount sufficient to permit the two rigid frames connected by the spindle 23 to make any vertical displacements relative to each other.

As indicated in Fig. 6, one of the lugs 12 and 13 of plate 14 may be connected to a double effect return spring 26, to effect a damping of the oscillations of the two rigid frames and bringing these back more rapidly to their center line. The return spring 26 is not indispensable, but in certain cases it is a convenient adjunct.

Fig. 7 represents a modified form of the members 14, 16 and 19. The inner surface 27 of the plate 14 is made spherical (in which case the plate 14 will be made in two pieces), the outer surface 28 of the bearing 16 being likewise spherical to co-operate therewith; the inner surface 29 of said bearing and the outer surface of the center bushing are then made cylindrical as shown.

The articulation proper, essentially comprising the members 14, 16 and 19, permits the rigid frames to take manifold positions relative to each other. The said articulation as such however, would not permit the point —e— (which, as indicated in Fig. 8, represents the projection of the axis of the spindle 23) to take a different position from that shown in Fig. 8, in which —e— represents not only the vertical projection of the spindle axis but also the point where the center lines e—f; e—g; e—h; and e—l of the two rigid frames meet.

Fig. 9 indicates the function performed by the above said articulation by means of the links 6 and 7, namely the function of permitting the vertical projection of the spindle 23 to take up different positions from the point at which the center lines e—m and n—p of the two rigid frames meet.

The following are some typical examples of the use of the novel coupling.

*Example No. 1.*

Fig. 10 shows an example of the application of the improved arrangement to the coupling of three rigid frame vehicles Q, R, S each of which being fitted with driving wheels, can develop a tractive force.

Assuming the direction of motion the three vehicles to be that indicated by the arrow T, the tractive force of the vehicle Q will be transmitted through the spindle 31 to the links 32 and 33, and to the respective vehicle sides 34 and 35, the link 32 being stressed in compression and the link 33 in tension.

In a similar manner the traction efforts of vehicles Q and vehicle R will be transmitted through the lugs 36 and 37 to the links 38 and 39, link 38 being stressed in tension and link 39 in compression; in their turn these two links will transmit the traction effort to the spindle 40 and vehicle S.

Assuming the direction of motion to be opposite to that indicated by the arrow T, the stresses on the links will be reversed.

It is obvious therefore that the articulated complex built up by the three vehicles Q, R, S will be capable of travelling in both directions. The couplings connecting the three vehicles may or not be provided with double effect return springs depending upon the circumstances.

In Fig. 10 double effect return springs 41 are shown.

*Example No. 2.*

Figures 11 and 12 illustrate an example of an application of the novel coupling to the connection of two vehicles each of which is fitted with driving wheels.

As in Example 1, the articulated coupling allows the assembled unit to travel in either direction.

According to requirements, buffers or return springs may be provided.

In Fig. 12 the two vehicles are shown fitted with buffers 42.

*Example No. 3.*

Figures 13 and 14 illustrate an example of the application of the novel coupling to the connection of a locomotive U with a vehicle V.

In this case of a single trailing vehicle each of the two links 43 and 44 may be arranged to point in the same direction so that both are stressed in tension.

Fig. 14 shows an example of the locomotive and trailing vehicle with buffers 45 placed between the two sections.

*Example No. 4.*

Fig. 15 illustrates an example of the application of the novel coupling to a plurality of vehicles connected with each other.

The advantages of the novel coupling system as compared with the types already known may be briefly summarized as follows:

1. It permits all oscillations and relative displacements, simultaneous or otherwise, in vertical, horizontal or oblique direction, to which the connected rigid frames may be subjected.

2. The weight of the connected units is not taken on the coupling.

3. The angular velocities of the links are independent.

4. As a coupling between driving units it permits travel in either direction.

5. The coupling is capable of transmitting great tractive effort without unduly high specific pressures on the friction parts and without impairing the flexibility and strength of the connection.

6. The vehicles that have been coupled together can readily be disconnected, all that is required for disconnecting them being the removal of the centre spindle.

Of course the structural details may be varied in practice from those described above and illustrated in the accompanying drawings.

Having now particularly described and ascertained the nature of my said invention and in what manner the same is to be performed, I declare that what I claim is:

1. A coupling for rigid frame units comprising, two coupling members adapted to be detachably connected together, means for attaching one of said coupling members to one rigid frame unit, and means for movably connecting the other coupling member to the other rigid frame unit, such movable connecting means comprising pivoted links connected to said coupling member and to the opposite sides of the rigid frame unit, the arrangement of said pivoted links being such that the force applied to the links on one side of said frame is equal in amount, identical in direction, and opposite in application to the force applied to the links on the opposite side of said frame.

2. A coupling for rigid frame units comprising, a bushing with spherical or cylindrical external surface, a bearing whose internal surface is formed to contact with the external surface of said bushing, a plate pivotally suspended between a pair of links, said links being in turn pivotally secured to the opposite sides of one of said frame units, and a spindle concentric with said bushing for pivotally connecting said plate to the rigid end of a second frame unit.

3. A coupling for rigid frame units comprising, a plate, a bushing, a bearing interposed between said plate and bushing, a pair of links pivotally secured between said plate and the opposite sides of one of said frame units, one link arranged to be placed under tension and the other under compression when a tractive force is exerted on the coupling, and a spindle concentric with said bushing for pivotally connecting said plate to the rigid end of a second frame unit.

Signed at Milan, Italy, this 16th day of January, 1925.

ATTILIO FRANCO.